United States Patent
Okamoto et al.

(10) Patent No.: US 11,371,367 B2
(45) Date of Patent: Jun. 28, 2022

(54) MANUFACTURING METHOD OF TURBINE HOUSING

(71) Applicant: Marelli Corporation, Saitama (JP)

(72) Inventors: Hiroyuki Okamoto, Saitama (JP); Satoru Yokoshima, Saitama (JP)

(73) Assignee: Marelli Corporation, Saitama (JP)

( * ) Notice: Subject to any disclaimer, the term of this patent is extended or adjusted under 35 U.S.C. 154(b) by 267 days.

(21) Appl. No.: 16/955,538

(22) PCT Filed: Dec. 21, 2018

(86) PCT No.: PCT/JP2018/047240
§ 371 (c)(1),
(2) Date: Jun. 18, 2020

(87) PCT Pub. No.: WO2019/124546
PCT Pub. Date: Jun. 27, 2019

(65) Prior Publication Data
US 2020/0318487 A1    Oct. 8, 2020

(30) Foreign Application Priority Data

Dec. 22, 2017 (JP) .............................. JP2017-245806
May 30, 2018 (JP) .............................. JP2018-103311

(51) Int. Cl.
| | |
|---|---|
| *B22C 9/04* | (2006.01) |
| *B22D 19/04* | (2006.01) |
| *F01D 9/02* | (2006.01) |
| *F01D 9/06* | (2006.01) |
| *F02B 39/00* | (2006.01) |
| *B22C 7/02* | (2006.01) |
| *F01N 13/18* | (2010.01) |

(52) U.S. Cl.
CPC .................. *F01D 9/02* (2013.01); *B22C 7/02* (2013.01); *B22C 9/04* (2013.01); *B22D 19/04* (2013.01); *F01D 9/06* (2013.01); *F01N 13/1872* (2013.01); *F02B 39/00* (2013.01); *F01N 2470/06* (2013.01)

(58) Field of Classification Search
CPC .............. B22C 7/02; B22C 9/04; B22D 19/04
See application file for complete search history.

(56) References Cited

U.S. PATENT DOCUMENTS

2010/0310362 A1    12/2010  Botsch

FOREIGN PATENT DOCUMENTS

| DE | 102012201871 A1 | 8/2013 |
|---|---|---|
| JP | S61-167105 A | 7/1986 |
| JP | H01-071137 U | 5/1989 |
| JP | 2003-056354 A | 2/2003 |

(Continued)

*Primary Examiner* — Kevin P Kerns
*Assistant Examiner* — Steven S Ha
(74) *Attorney, Agent, or Firm* — Young Basile Hanlon & MacFarlane, P.C.

(57) ABSTRACT

In a manufacturing method of a turbine housing having an exhaust gas flow path, the exhaust gas flow path in the turbine housing is formed of a sheet-metal-made divided body and a cast-metal-made divided body, the sheet-metal-made divided body is formed by press molding a sheet metal material, and the cast-metal-made divided body is molded by casting, when the cast-metal-made divided body is cast, one end of the sheet-metal-made divided body is cast into the cast-metal-made divided body by melting the one end of the sheet-metal-made divided body such that the original shape thereof is disappeared.

7 Claims, 10 Drawing Sheets

(56) References Cited

FOREIGN PATENT DOCUMENTS

| | | |
|---|---|---|
| JP | 2004-143937 A | 5/2004 |
| JP | 2011-501021 A | 1/2011 |
| JP | 2015-001218 A | 1/2015 |

MANUFACTURING METHOD OF TURBINE HOUSING

CROSS-REFERENCE TO RELATED APPLICATIONS

This application is a national stage 371 of PCT/JP2018/047240, filed Dec. 21, 2018, which claims priority to Japan Application Patent Serial No. 2017-245806, filed Dec. 22, 2017, and Japanese Patent Application No. 2018-103311, filed May 30, 2018, the entire disclosures of which are hereby incorporated by reference.

TECHNICAL FIELD

The present invention relates to a manufacturing method of a turbine housing used for a turbocharger (turbo-supercharger) of a vehicle.

BACKGROUND

As a turbine housing used for a turbocharger, that made of a cast metal is generally used and is proposed in Japanese Unexamined Patent Application Publication No. 2003-56354, for example. In Japanese Unexamined Patent Application Publication No. 2003-56354, the turbine housing is manufacture by a lost wax precision casting process, is light weighted, and has a heat resistance.

In addition, Japanese Unexamined Patent Application Publication No. 2004-143937 proposes, for example, a sheet-metal-made turbine housing that is fabricated by press molded pieces of steel plates in order to achieve further weight reduction. According to Japanese Unexamined Patent Application Publication No. 2004-143937, a base portion is formed by casting on one end of a sheet-metal-made shell body. In other words, the base portion is integrally joined to the one end of the sheet-metal-made shell body by being cast thereinto.

SUMMARY

However, if the turbine housing is manufactured by using the method disclosed in Japanese Unexamined Patent Application Publication No. 2004-143937, the shell body functions as a chill (heat sink) within a casting mold, and there is a possibility that the shell body does not melt completely and remains unmelted in a molten metal. In other words, a casting material only adheres on a surface of the unmelted shell body, and a situation in which a boundary surface is formed between the shell body and the casting material may occur. Furthermore, there is also a case in which spaces, such as cracks, are formed between the shell body and the casting material. With such a joined state, a joint strength is not enough, and there is a risk in that fatigue failure is caused due to a vibration and/or a thermal stress in a usage environment of the turbine housing.

The present invention has been conceived in order to solve the above-described problems, and an object thereof is to provide a manufacturing method of a turbine housing capable of sufficiently ensuring a joint strength.

According to the present invention, in a manufacturing method of a turbine housing in which an exhaust gas flow path in the turbine housing is formed with a sheet-metal-made divided body and a cast-metal-made divided body, and the sheet-metal-made divided body is formed by press molding a sheet metal material and the cast-metal-made divided body is molded by a casting, one end of the sheet-metal-made divided body is cast into the cast-metal-made divided body by melting the one end such that its original shape is disappeared during the casting of the cast-metal-made divided body.

According to the present invention, even in a case in which a sheet-metal-made member and a member made of the casting material are integrally joined, it is possible to sufficiently ensure a joint strength and to reduce a possibility of occurrence of fatigue failure due to vibration and/or thermal stress in a usage environment of a turbine housing.

DETAILED DESCRIPTION

An embodiment of the present invention will be described below with reference to the drawings.

Figure 1:
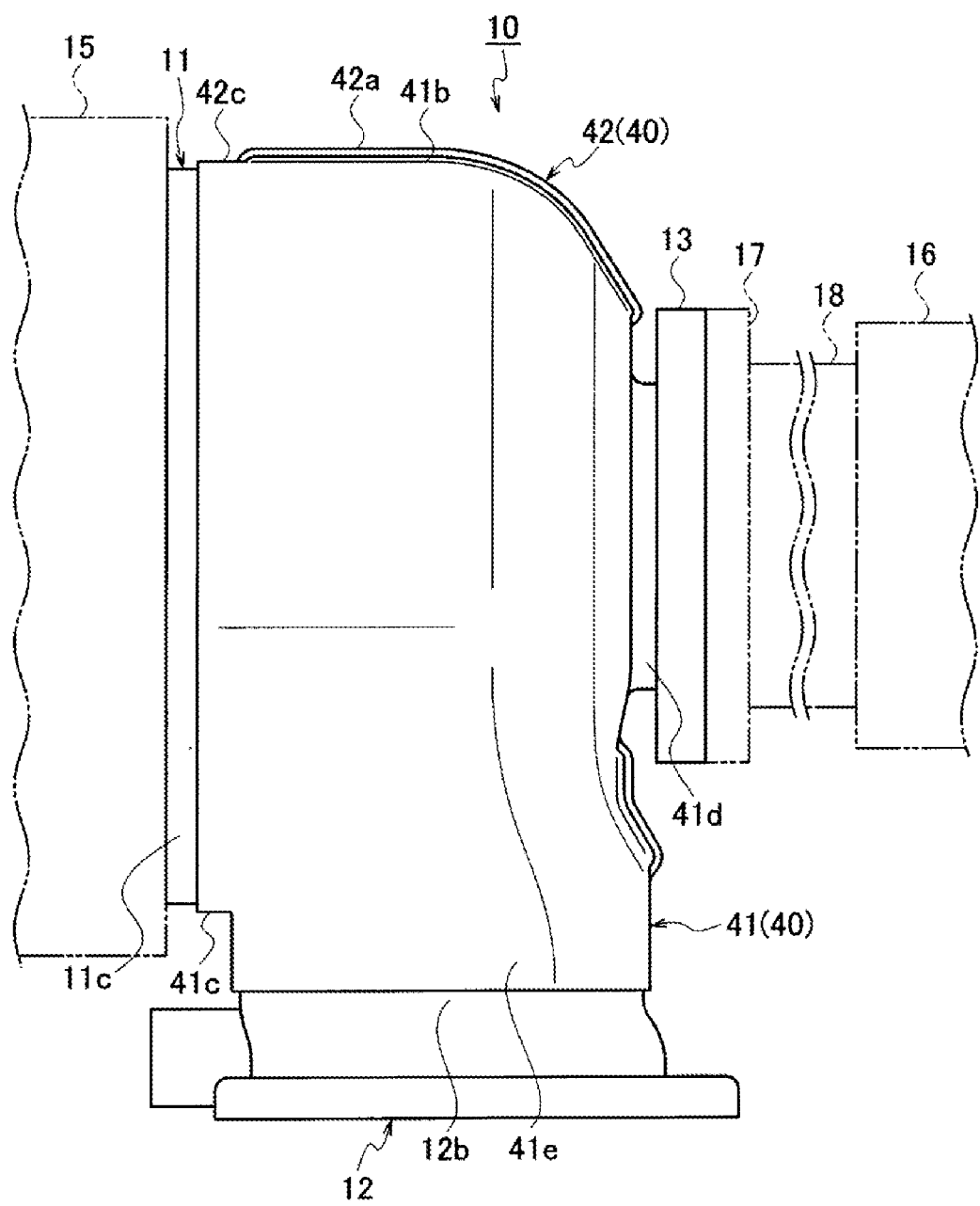
FIG. 1 is a side view of a turbine housing used for a turbocharger of an embodiment of the present invention.
Figure 2:
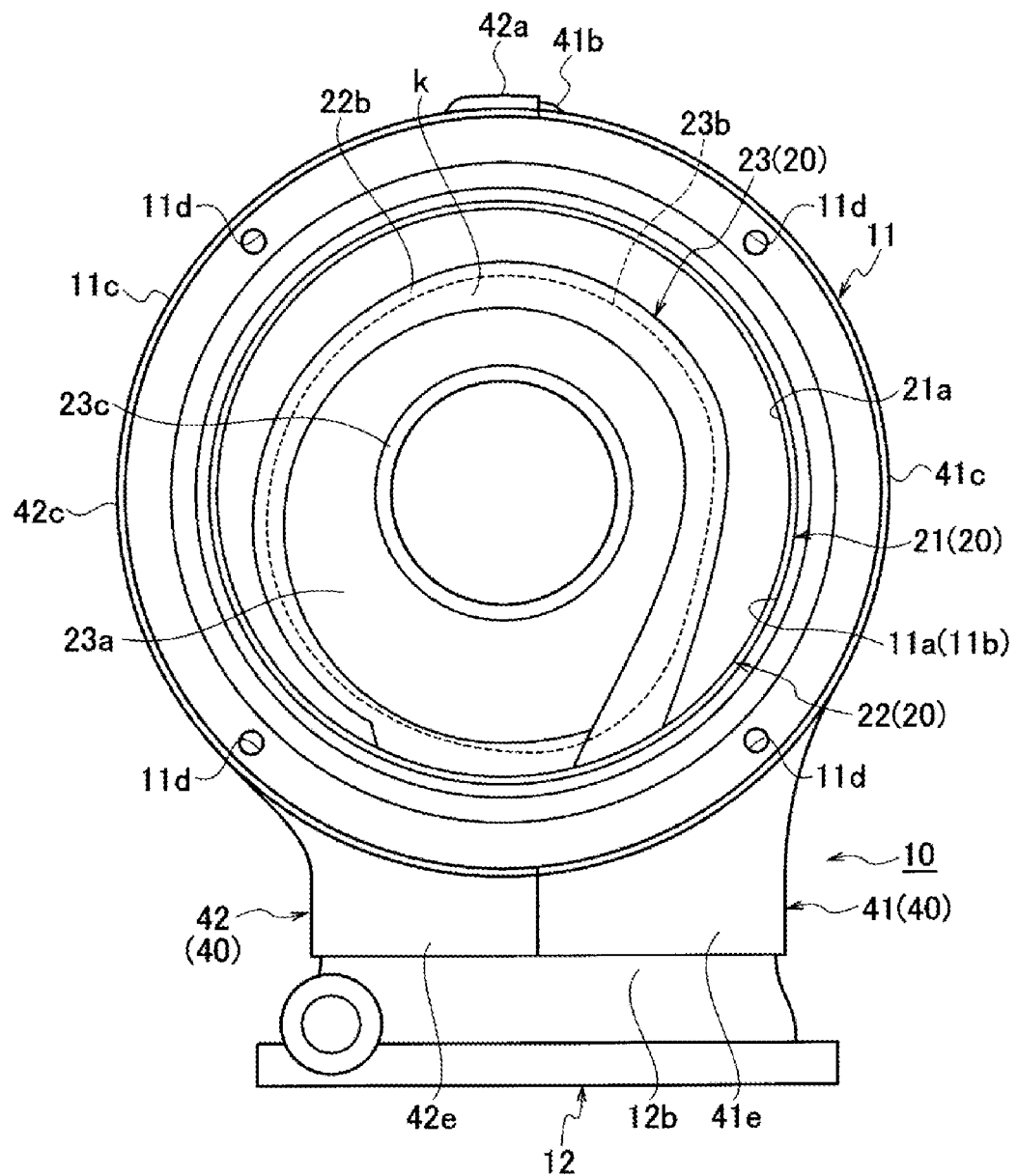
FIG. 2 is a front view of the above-described turbine housing.
Figure 3:
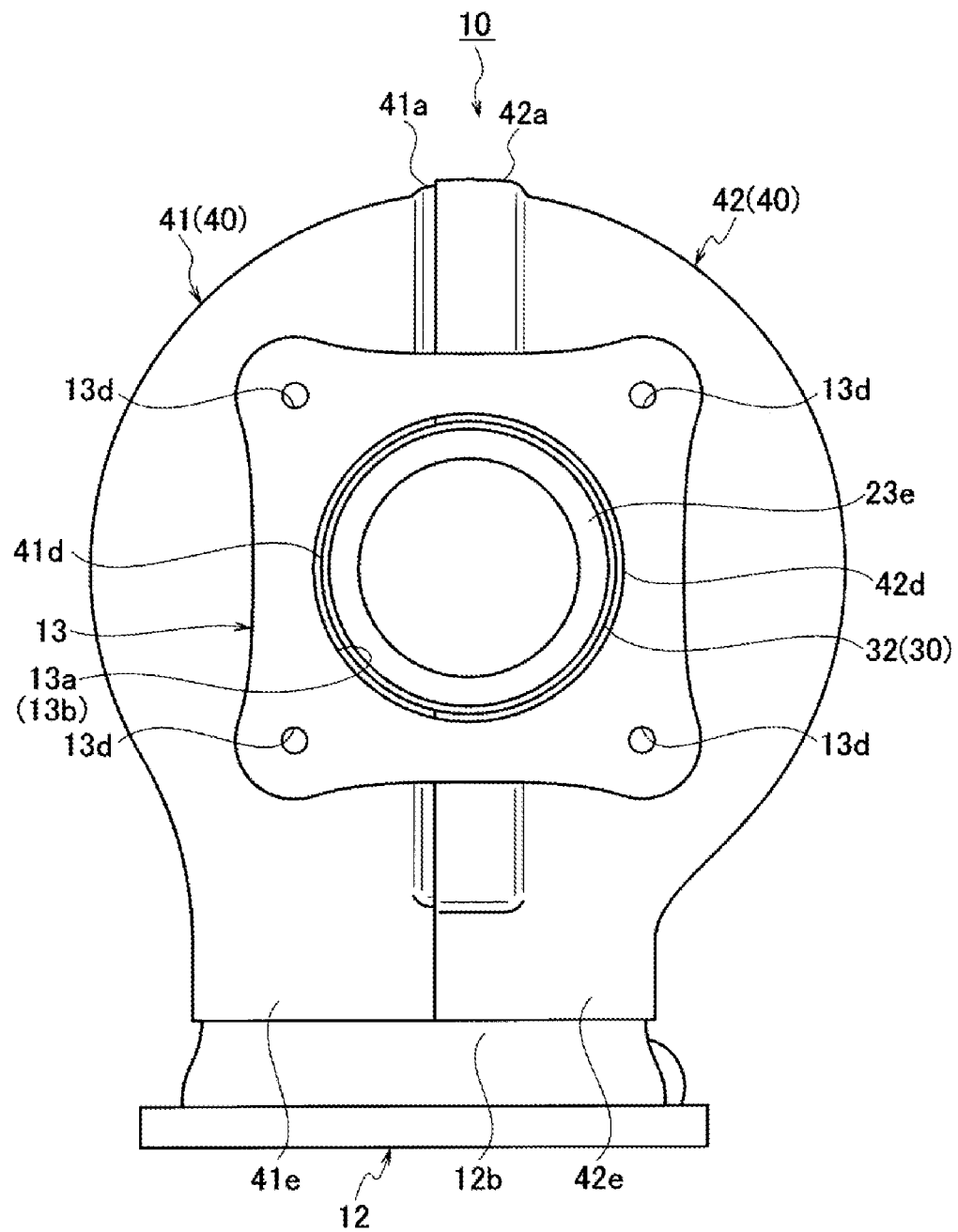
FIG. 3 is a rear view of the above-described turbine housing.
Figure 4:
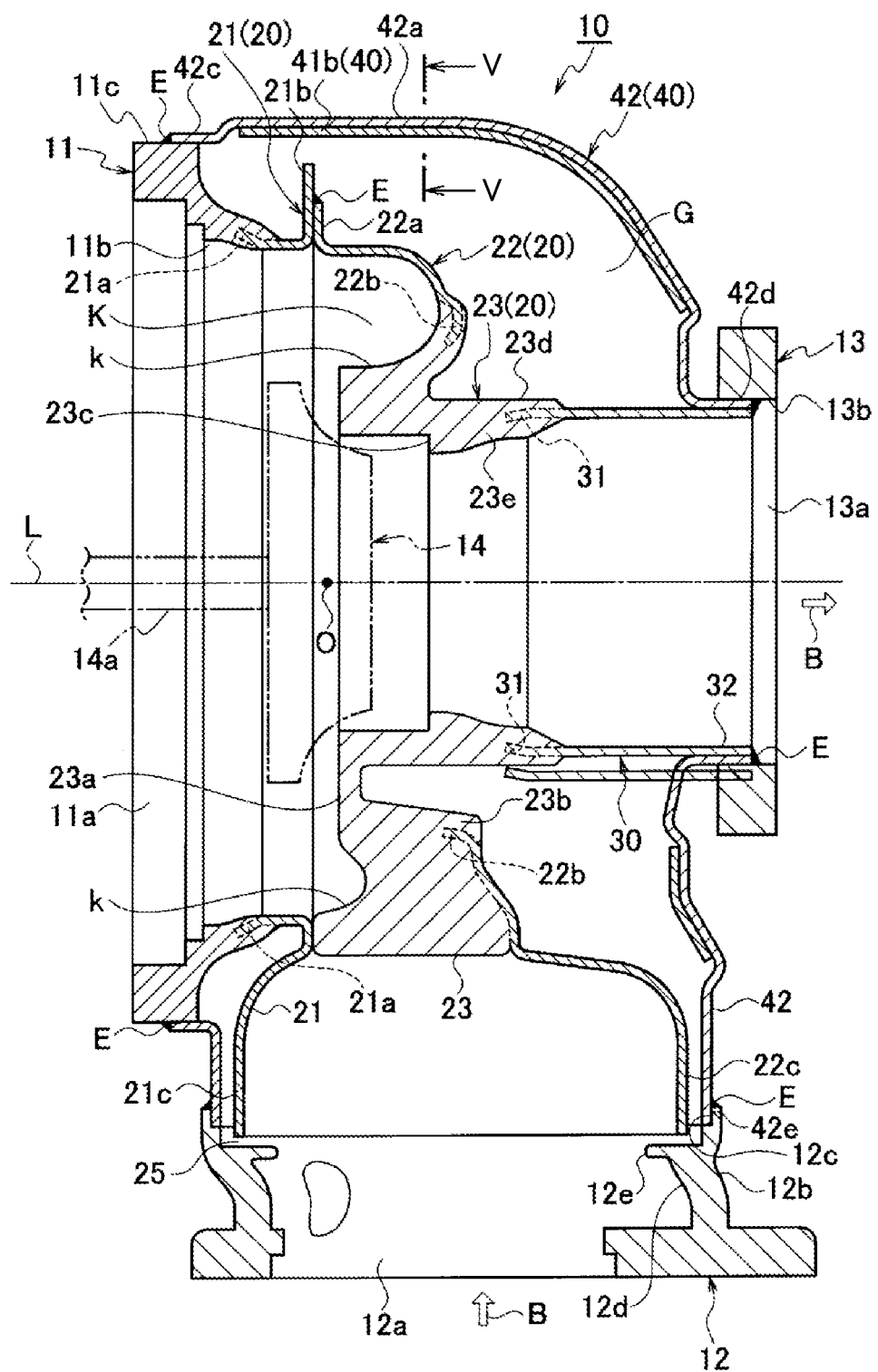
FIG. 4 is a sectional view of the above-described turbine housing.
Figure 5:
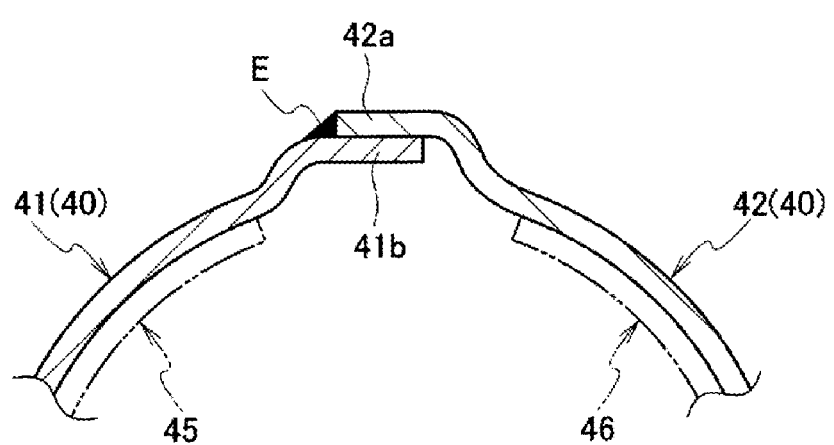
FIG. 5 is a sectional view taken along a line V-V in FIG. 4.
Figure 6:
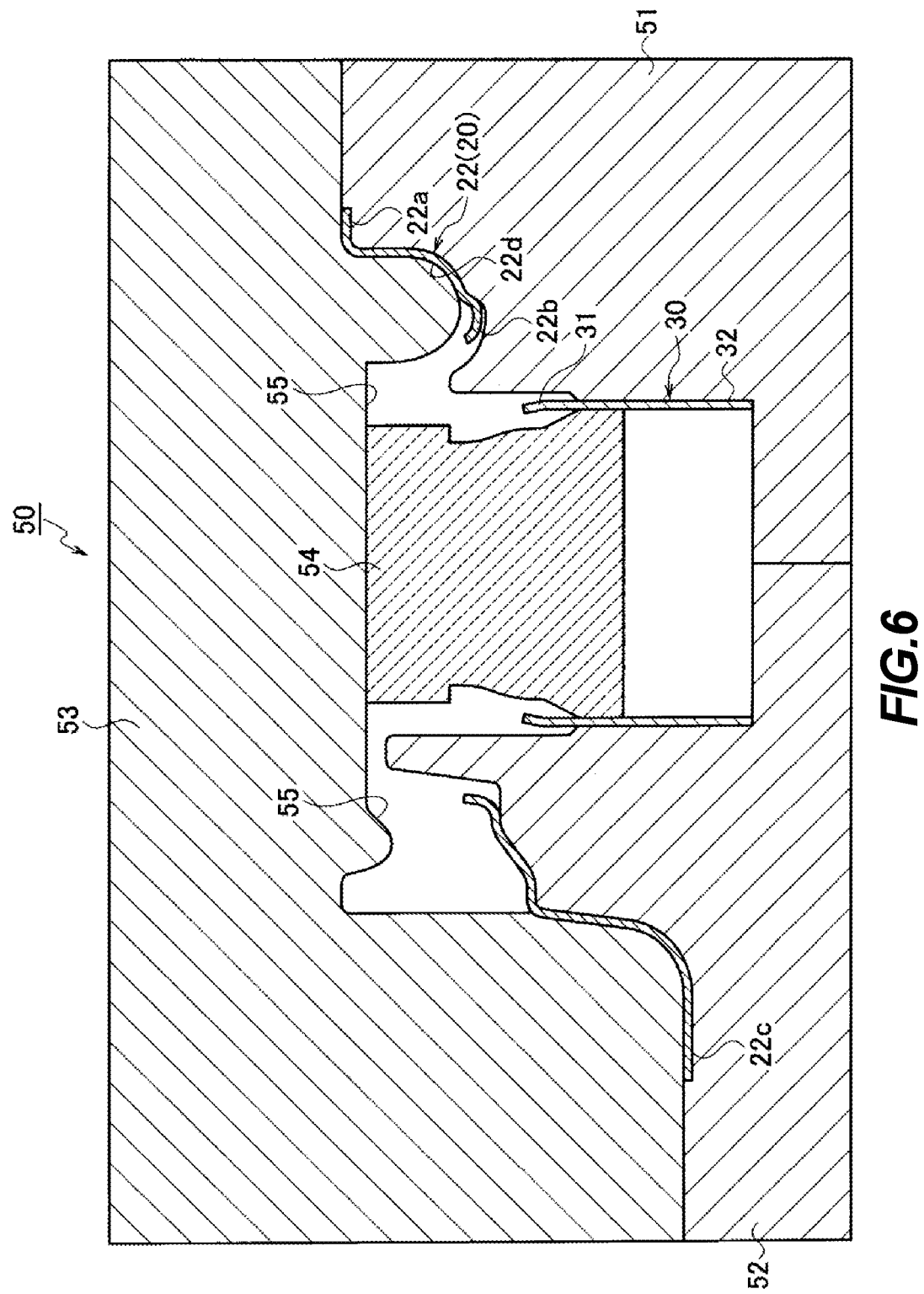
FIG. 6 is a sectional view of a casting mold for precision casting a sheet-metal-made member and a sheet-metal-made exhaust tube of the above-described turbine housing.
Figure 7:
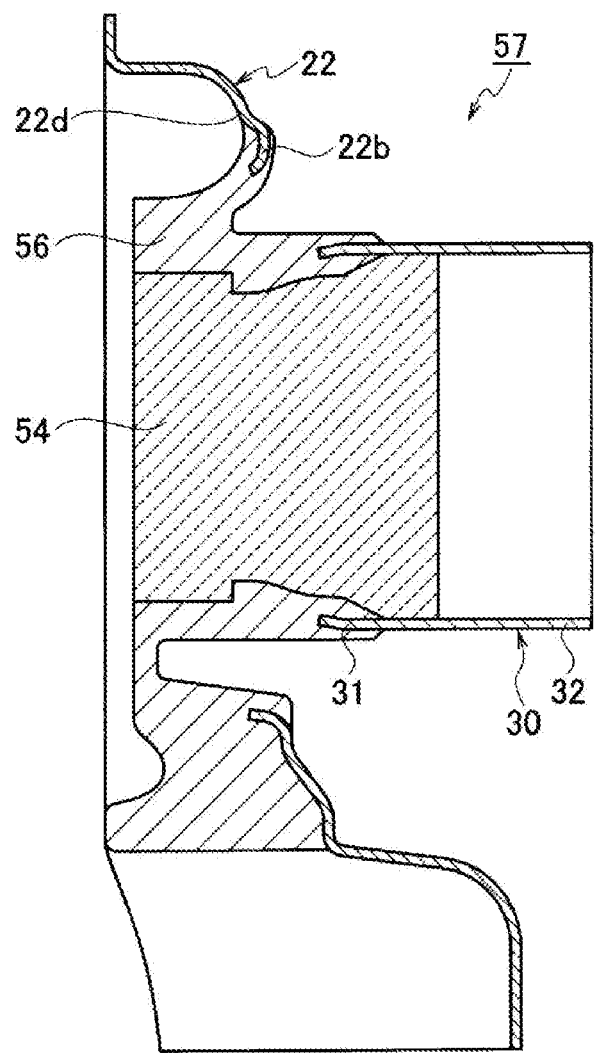
FIG. 7 is a sectional view of a wax mold that is insert molded in the above-described casting mold.
Figure 8:
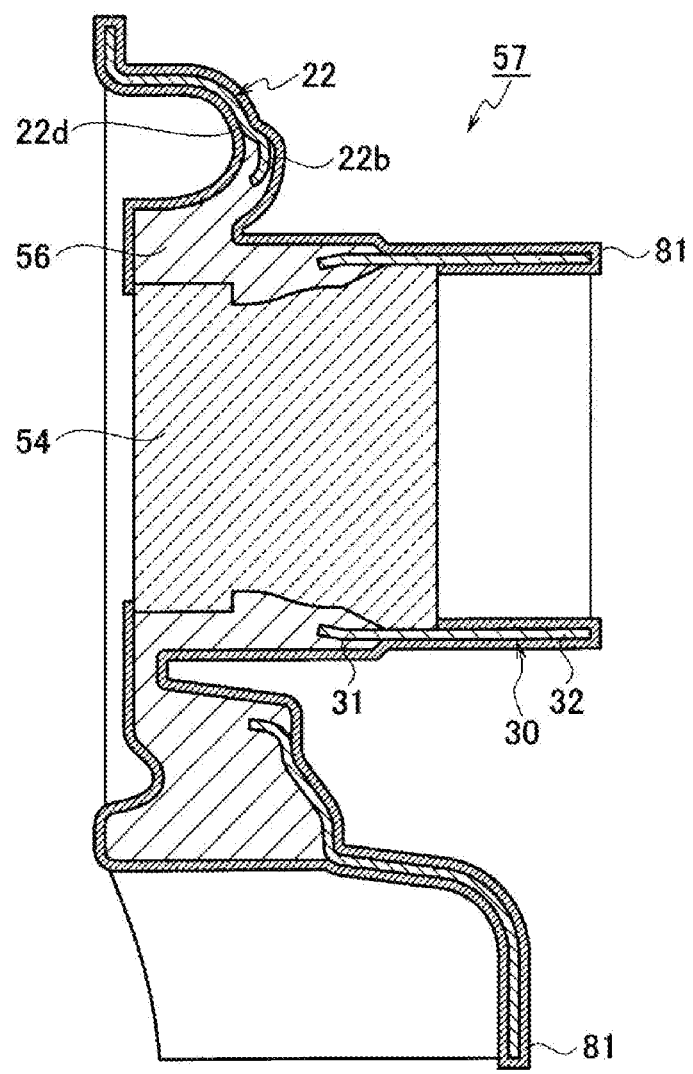
FIG. 8 is a sectional view of the wax mold on a surface of which a coating layer is formed.
Figure 9:
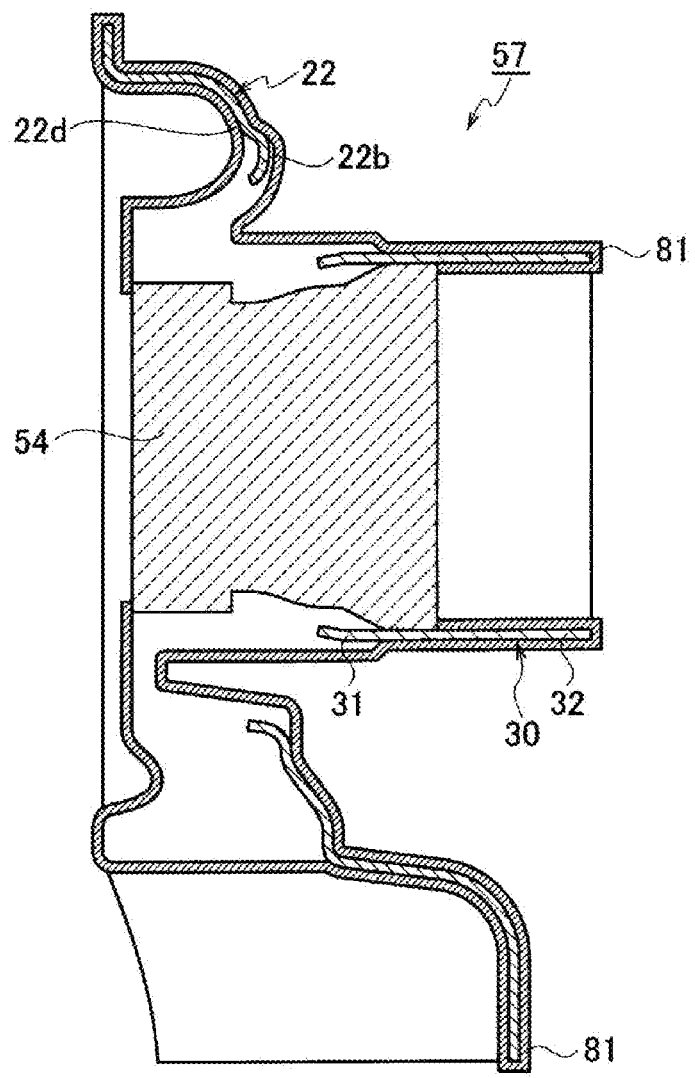
FIG. 9 is a sectional view of a state in which a cavity has been formed by melting and removing the wax mold.
Figure 10:
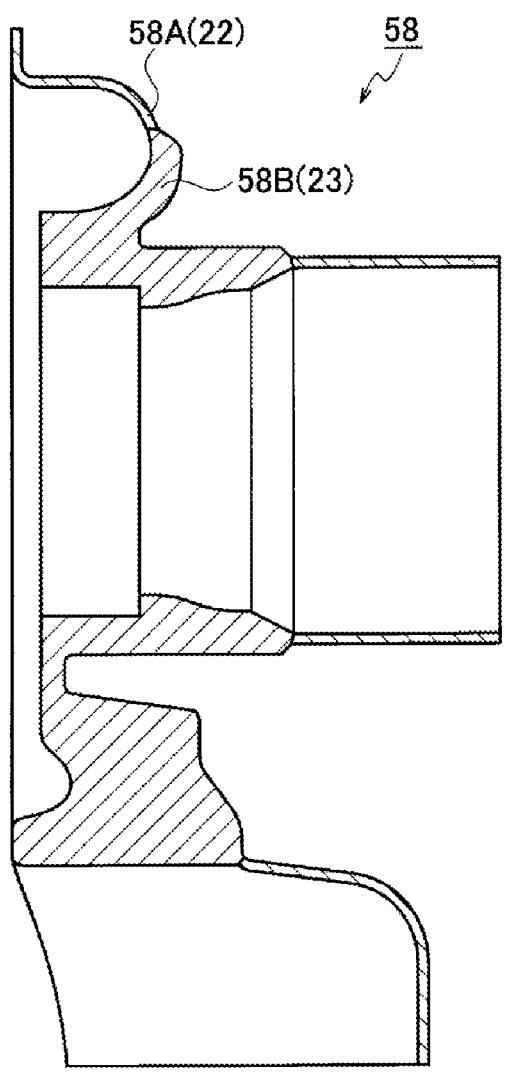
FIG. 10 is a sectional view of a molded part that is precision cast by using the above-described casting mold.

FIG. 1 is a side view of a turbine housing used for a turbocharger of an embodiment of the present invention, FIG. 2 is a front view of the turbine housing, FIG. 3 is a rear view of the turbine housing, FIG. 4 is a sectional view of the turbine housing, FIG. 5 is a sectional view taken along a line V-V in FIG. 4, FIG. 6 is a sectional view of a casting mold for precision casting a sheet-metal-made member and a sheet-metal-made exhaust tube of the turbine housing, FIG. 7 is a sectional view of wax mold that is insert molded in the casting mold, FIG. 8 is a sectional view of the wax mold on a surface of which a coating layer is formed, FIG. 9 is a sectional view of a state in which a cavity has been formed by melting and removing the wax mold, and FIG. 10 is a sectional view of a molded part that is precision cast by using the casting mold.

As shown in FIGS. 1 to 4, a turbine housing 10 is used as a housing of a turbocharger (turbo-supercharger) of a vehicle. The turbine housing 10 has a double-shell (double pipe) structure formed of: an inner pipe 20 that forms an exhaust gas flow path K provided among a cast-metal-made center flange 11, an exhaust-air-inlet-side flange 12, which is made of a cast metal, forming an inlet 12a for exhaust gas B, and an exhaust-air-outlet-side flange 13 (the downstream side of exhaust air flow) forming an outlet 13a for the exhaust gas B; an exhaust tube 30 that is connected to a part of the inner pipe 20 (a cylinder shaped portion 23d) on the exhaust-air-outlet side; and an outer pipe 40 that covers both of the inner pipe 20 and the exhaust tube 30 such that a predetermined space G is formed therebetween. In the turbine housing 10, the exhaust gas B that has entered from the inlet 12a of the exhaust-air-inlet-side flange 12 is discharged from the outlet 13a of the exhaust-air-outlet-side flange 13 made of a cast metal via a turbine wheel 14 that is provided at the spiral center portion (center portion) O of the inner pipe 20.

As shown in FIG. 1, a compressor 15 is connected to the center flange 11. In addition, a catalytic converter (emission control device) 16 for removing toxic pollutants from the exhaust gas B is connected via a joint flange 17 and a joint tube 18 to the exhaust-air-outlet-side flange 13 through which the exhaust gas B is discharged. In other words, the turbine housing 10 is disposed between the compressor 15 provided on the intake air inlet side and the catalytic converter 16.

As shown in FIGS. 2 and 4, the inner pipe 20 essentially defines and forms the exhaust gas flow path K for the exhaust gas B in the housing. The outer pipe 40 forms an outer-shell structure body that completely covers the inner pipe 20 and the exhaust tube 30 such that the predetermined space G is formed between the outer pipe 40 and both of the inner pipe 20 and the exhaust tube 30, that protects the inner pipe 20 and the exhaust tube 30 so as to simultaneously provide thermal insulation, and that achieves the purpose of increasing rigidity of the turbine housing 10 as a whole.

As shown in FIG. 4, the inner pipe 20 is formed of: a first inner-pipe divided body 21 (sheet-metal-made divided body) and a second inner-pipe divided body 22 (sheet-metal-made divided body) that are formed by being divided into two members along the direction orthogonal to the shaft direction L of a turbine shaft 14a of the turbine wheel 14; and a third inner-pipe divided body 23 (cast-metal-made divided body) that is formed of a precision-cast-metal-made member and that is located at a regional part (a region on the side of the exhaust air outlet of the exhaust gas B) facing the turbine wheel 14. The first inner-pipe divided body 21 and the second inner-pipe divided body 22 are formed of thin plate-like shaped sheet-metal-made members. In the above, the third inner-pipe divided body 23 is formed by a lost wax precision casting process by using a casting material having higher heat resistance than sheet metal material. As the sheet metal material forming the first inner-pipe divided body 21 and the second inner-pipe divided body 22, for example, SUS429 or SUS430 that is a ferritic stainless steel may be used. In addition, as the casting material, a material having the equivalent property with the sheet metal material is used. In this embodiment, the ferritic stainless steel is used in accordance with the sheet metal material.

As shown in FIGS. 2 and 4, the first inner-pipe divided body 21 and the second inner-pipe divided body 22 are molded into a predetermined curved tube shape by subjecting the sheet metal to press working. A rear-circumferential-edge-side end portion 21b and a front-circumferential-edge-side end portion 22a of two thus-press molded members made of sheet metal, i.e. the first inner-pipe divided body 21 and the second inner-pipe divided body 22, respectively, are jointed and fixed by being welded. In other words, the end portion 21b of the first inner-pipe divided body 21 on the rear circumferential edge side and the end portion 22a of the second inner-pipe divided body 22 on the front circumferential edge side are formed by being bent outward so as to respectively have different vertical lengths, and these end portions 21b and 22a having different lengths are mutually fixed by being welded (a welded portion is shown by a reference sign E).

In addition, as shown in FIGS. 2 and 4, the third inner-pipe divided body 23 is a precision-cast-part and is molded into the predetermined curved tube shape. As shown in FIG. 4, a portion of the sheet-metal-made second inner-pipe divided body 22 on the side of a rear-circumferential-edge-side end portion 22b and a portion of the precision-cast-metal-made third inner-pipe divided body 23 on the side of a stepped-recessed shaped end portion 23b on the rear outer circumference edge side are mutually joined by integrally casting the portion of the sheet-metal-made second inner-pipe divided body 22 on the side of the rear-circumferential-edge-side end portion 22b into the third inner-pipe divided body 23 in a precision casting step of the third inner-pipe divided body 23. In FIG. 4, although the end portion 22b cast into the third inner-pipe divided body 23 is shown by a dotted line, for the sake of simplification of the description, it merely illustrates the shape of the sheet metal of the end portion 22b before being cast. In reality, when the third inner-pipe divided body 23 is being cast, the end portion 22b is cast into the third inner-pipe divided body 23 by being melted (the end portion 22b is melted such that the original shape thereof is disappeared), and the second inner-pipe divided body 22 is integrated with the third inner-pipe divided body 23. With such a configuration, the regional part of the inner pipe 20 facing the turbine wheel 14 serving as the region on the side of the exhaust air outlet of the exhaust gas B is formed by the precision-cast-metal-made third inner-pipe divided body 23 formed of the precision-cast-metal-made member, and a remaining regional part is formed of the sheet-metal-made first inner-pipe divided body 21 and the second inner-pipe divided body 22, which are respectively made of sheet-metal-made plate members, such that the exhaust gas flow path K is formed inside.

Furthermore, as shown in FIGS. 2 and 4, a front surface 23a of the precision-cast-metal-made third inner-pipe divided body 23 is formed to have a flat portion, and is formed such that the surface area of a lower part of the front surface 23a (the exhaust-air-inlet-side flange 12 side) is larger than the surface area of an upper part of the front surface 23a (the opposite side from the exhaust-air-inlet-side flange 12). In other words, as shown in FIG. 4, the precision-cast-metal-made third inner-pipe divided body 23 is formed such that the regional part closer to the exhaust-air-inlet-side flange 12 has greater thickness than the regional part on the opposite side thereof. With such a configuration, a part of a flow path surface k of the exhaust gas flow path K in the inner pipe 20 is formed by the precision-cast-metal-made third inner-pipe divided body 23.

Furthermore, a recessed portion 23c having a stepped-annular shape is formed on the exhaust-air-inlet side of the precision-cast-metal-made third inner-pipe divided body 23, and the cylinder shaped portion (barrel shaped portion) 23d is integrally formed on the exhaust-air-outlet side of the precision-cast-metal-made third inner-pipe divided body 23 so as to project out therefrom. A reinforcing member (not shown) having an annular ring shape for protecting the turbine wheel 14 is fitted into the recessed portion 23c having the stepped-annular shape.

In addition, as shown in FIG. 4, an inner wall of the cylinder shaped portion 23d of the precision-cast-metal-made third inner-pipe divided body 23 is formed to have an inclined surface 23e having a substantially conical shape, the diameter of which increases toward the outlet side. In the precision casting step of the third inner-pipe divided body 23, a portion of the inner wall of the cylinder shaped portion 23d of the third inner-pipe divided body 23 on the inclined surface 23e side and a portion of the sheet-metal-made exhaust tube 30 having a cylinder shape on a front-side end portion 31 side are joined by integrally casting the portion of the exhaust tube 30 on the front-side end portion 31 side into the portion of the inner wall of the cylinder shaped portion 23d of the third inner-pipe divided body 23 on the inclined surface 23e side, and thereby, the sheet-metal-made exhaust tube 30 is jointed with the precision-cast-metal-made third inner-pipe divided body 23. In FIG. 4, although the end portion 31 cast into the third inner-pipe divided body 23 is shown by the dotted line, for the sake of simplification of the description, it merely illustrates the shape of the sheet metal of the end portion 31 before being cast. In reality, when the third inner-pipe divided body 23 is being cast, the end portion 31 is cast into the third inner-pipe divided body 23 by being melted (the end portion 31 is melted such that the original shape thereof is disappeared), and the exhaust tube 30 is integrated with the third inner-pipe divided body 23.

As shown in FIGS. 1 to 4, the outer pipe 40 is formed of two sheet-metal-made thin plate members, i.e. a first outer-pipe divided body 41 and a second outer-pipe divided body 42, formed by halving the outer pipe 40 along the shaft direction L (the direction of vibration during the travel of the vehicle) of the turbine shaft 14a of the turbine wheel 14. The first outer pipe divided body 41 and the second outer pipe divided body 42 are molded into a predetermined curved shape by subjecting the sheet metal to the press working. Two thus-press molded members, i.e. the sheet-metal-made first outer pipe divided body 41 and the sheet-metal-made second outer pipe divided body 42, are joined by the welding, and thereby, the inner pipe 20 and the exhaust tube 30 are completely covered such that the predetermined space G is formed between the outer pipe 40 and both of the inner pipe 20 and the exhaust tube 30.

In other words, as shown in FIGS. 1, 3, and 4, a second end portion 41b of the sheet-metal-made first outer pipe divided body 41 extending by forming a step and a first end portion 42a of the sheet-metal-made second outer pipe divided body 42 extending by forming a step are fixed to each other by overlaying the first end portion 42a on the second end portion 41b of the first outer pipe divided body 41 and by being welded (the welded portions are shown by the reference sign E) along the shaft direction (shaft line direction) L of the turbine shaft 14a of the turbine wheel 14. With such a configuration, because expansion and/or contraction is caused about the shaft direction L of the turbine shaft 14a during the travel of the vehicle, the welding is performed along the shaft direction L, and thereby, a fracture of the weld line is prevented.

In addition, as shown in FIG. 5, sheet-metal-made plates (reinforcing plates) 45 and 46, which are press molded so as to extend along the curved shape of the outer pipe 40, are respectively fixed to inner surfaces of the sheet-metal-made first outer-pipe divided body 41 and the sheet-metal-made second outer-pipe divided body 42 forming the outer pipe 40 by welding at one or more spots (spot welding).

As shown in FIGS. 2 and 4, the center flange 11 is formed to have an annular shape, and a bearing (not shown) for the turbine shaft 14a of the turbine wheel 14 is arranged in a circular opening portion 11a at the center of the center flange 11. In the precision casting step of the center flange 11, the sheet-metal-made first inner-pipe divided body 21 is joined to a portion of the center flange 11 on the side of an inner circumferential surface 11b by integrally casting a portion of the sheet-metal-made first inner-pipe divided body 21 on the side of a front-circumferential-edge-side end portion 21a into the portion of the center flange 11 on the side of the inner circumferential surface 11b. In FIG. 4, although the end portion 21a cast into the center flange 11 is shown by the dotted line, for the sake of simplification of the description, it merely illustrates the shape of the sheet metal of the end portion 21a before being cast. In reality, when the center flange 11 is being cast, the end portion 21a is cast into the center flange 11 by being melted (the end portion 21a is melted such that the original shape thereof is disappeared), and the first inner-pipe divided body 21 is integrated with the center flange 11.

In addition, respective front-circumferential-edge-side end portions 41c and 42c of the sheet-metal-made first outer pipe divided body 41 and the sheet-metal-made second outer pipe divided body 42 forming the outer pipe 40 are fixed to an outer circumferential surface 11c of the center flange 11 by being welded (welded portions are shown by the reference sign E). In the above, a plurality of screw holes 11d for attaching bolts are formed in the center flange 11 at equal intervals.

As shown in FIG. 4, the exhaust-air-inlet-side flange 12 is formed so as to have a substantially annular shape, and its opening portion 12a forms the inlet of the exhaust gas B. A recessed portion 12c having the stepped-annular shape is formed at the inner side of the top side of an outer circumferential surface 12b of the exhaust-air-inlet-side flange 12, and a stepped portion 12e is integrally formed on an intermediate part of an inner circumferential surface 12d of the exhaust-air-inlet-side flange 12 so as to protrude radially inward. A lower end portion 21c side of the sheet-metal-made first inner-pipe divided body 21 and a lower end portion 22c side of the sheet-metal-made second inner-pipe divided body 22 of the inner pipe 20 are each formed to have a semi-arc curved shape extending along the stepped portion 12e and loosely fitted so as to be freely extendable/contractable by forming an opening portion (space) 25 with the stepped portion 12e.

In addition, as shown in FIGS. 2 to 4, lower end portions 41e and 42e sides of the sheet-metal-made first outer-pipe divided body 41 and the sheet-metal-made second outer-pipe divided body 42 forming the outer pipe 40 are respectively formed to have the semi-arc curved shape extending along the recessed portion 12c of the exhaust-air-inlet-side flange 12 and fixed to the upper side of the outer circumferential surface 12b by being welded (the welded portion is shown by the reference sign E) in a state in which both are fitted into the recessed portion 12c. In the above, a plurality of screw holes (not shown) for attaching bolts are formed in the exhaust-air-inlet-side flange 12 at equal intervals.

Furthermore, as shown in FIGS. 3 and 4, the exhaust-air-outlet-side flange 13 is formed to have a substantially rectangular plate shape, and a circular opening portion 13a forms the outlet of the exhaust gas B at its center. A rear-side end portion 32 of the exhaust tube 30 and respective rear-circumferential-edge side end portions 41d and 42d of the sheet-metal-made first outer pipe divided body 41 and the sheet-metal-made second outer pipe divided body 42 forming the outer pipe 40 are fixed to an inner circumferential surface 13b of the exhaust-air-outlet-side flange 13 by being welded (the welded portion is shown by the reference sign E). In the above, screw holes 13d for attaching bolts are respectively formed on corner portions of the exhaust-air-outlet-side flange 13.

The sheet-metal-made second inner-pipe divided body 22, the cast-metal-made third inner-pipe divided body 23 forming the region on the side of the exhaust air outlet of the exhaust gas B, and the sheet-metal-made exhaust tube 30 of the turbine housing 10 of the above-described embodiment are manufactured by the lost wax precision casting process using a casting mold 50 formed of a pair of bottom molds 51 and 52 and a top mold 53, shown in FIG. 6.

More specifically, as shown in FIG. 6, in the press step of the sheet-metal-made second inner-pipe divided body 22, in advance, a bent portion 22b is press molded in a portion to be inserted in a wax 56, and a passage inner surface (gas flow path surface) side of the sheet-metal-made second inner-pipe divided body 22 is press molded to a surface 22d that is smoothly connected to the cast-metal-made third inner-pipe divided body 23 without forming a step.

Next, the bottom mold is formed by sandwiching a core 54 for the lost wax (for example, a ceramic core) that is formed integrally with the exhaust tube 30 in advance between the pair of bottom molds 51 and 52.

Next, the sheet-metal-made second inner-pipe divided body 22, which is pre-press molded, is arranged on the pair of bottom molds 51 and 52, and then, the top mold 53 is placed on the pair of bottom molds 51 and 52. From this state, the wax 56 (wax) is injected into a cavity 55 of the casting mold 50 to mold a wax mold 57 (wax pattern) into which the exhaust tube 30 and the second inner-pipe divided body 22 are inserted. As shown in FIG. 7, the completed wax mold 57 is in a state in which the core 54 for the lost wax is placed in the exhaust tube 30.

Next, the casting mold 50 is formed.

A sprue gate is first provided on the wax mold 57, and as shown in FIG. 8, a surface of the wax mold 57 is subjected to a ceramic coating (multiple layers are formed), thus forming a coating layer 81 (a ceramic layer). Next, a heating and removal of the wax are performed. In other words, the wax mold 57 that has been subjected to the ceramic coating is heated to melt and remove the wax 56 from the sprue gate to the outside, and thereby, as shown in FIG. 9, a cavity is formed at a portion where the wax 56 was present. Next, by performing baking, the casting mold 50 is completed.

In a step (a heating/wax removal step) of melting and removing the wax 56 from the sprue gate to the outside by heating the wax mold 57 having the ceramic coating, the wax mold 57 is heated at a temperature equal to or higher than the melting point of the wax. At this time, in order to prevent occurrence of abnormal oxidation of the sheet metal during the heating/wax removal step, the maximum temperature for heating the wax mold 57 in the heating/wax removal step is set at a high-temperature oxidation resisting temperature of the material forming the sheet metal (the temperature at which the material is resistive to the abnormal oxidation). For example, in the heating/wax removal step, the wax mold 57 is heated at a temperature ranging from 700° C. to 1300° C. In the above, in a case in which SUS430 is used as the sheet metal material, because the high-temperature oxidation resisting temperature of SUS is about 900° C., the wax mold 57 is heated at about 700° C. to 900° C., accordingly.

If an oxide film is formed on the surface of the sheet metal, the oxide film inhibits melting of the sheet metal in the casting step, which will be described later. Therefore, in the heating/wax removal step, the temperature during the heating of the wax mold 57 is controlled such that the formation of the oxide film on the surface of the sheet metal is suppressed.

Next, a molten metal is poured from the sprue gate into the cavity 55 in the casting mold 50, which is formed after the wax 56 has been melted and removed, the mold is released after the molten metal has cooled, removal of the casting mold 50, the core 54, and the sprue gate are performed, and a finishing process is performed by removing burrs, etc. By doing so, a molded part 58 as shown in FIG. 10 is completed, and in the exhaust tube 30 and the second inner-pipe divided body 22, a regional part of a sheet metal portion 58A that has been cast and a cast portion 58B are completely melted. In other words, one end of the sheet metal portion 58A is cast into the cast portion 58B by melting the one end of the sheet metal portion 58A such that the original shape thereof is disappeared. FIG. 10 shows a state in which, at the time of the casting of the third inner-pipe divided body 23, the end portion 22b is cast into the third inner-pipe divided body 23 by being melted, the end portion 22b is disappeared, and the second inner-pipe divided body 22 is integrated with the third inner-pipe divided body 23. In addition, FIG. 10 shows a state in which, at the time of the casting of the third inner-pipe divided body 23, the end portion 31 is cast into the third inner-pipe divided body 23 by being melted, the end portion 31 is disappeared, and the exhaust tube 30 is integrated with the third inner-pipe divided body 23. Similarly to the integrated state shown in FIG. 10, at the time of the casting of the center flange 11, the end portion 21a is cast into the center flange 11 by being melted, the end portion 21a is disappeared, and the first inner-pipe divided body 21 is integrated with the center flange 11.

In the above, in a step of pouring the molten metal (the casting step) from the sprue gate into the cavity 55 in the casting mold 50 that is formed after the wax 56 has been melted and removed, the melting point of the wax is employed as the minimum temperature and the high-temperature oxidation resisting temperature of the material forming the sheet metal is employed as the maximum temperature, and then, the wax mold 57 is heated at a temperature between the minimum temperature and the maximum temperature. For example, in the casting step, the wax mold 57 is heated at a temperature ranging from 700° C. to 1300° C. In a case in which SUS430 is used as the sheet metal material, because the high-temperature oxidation resisting temperature of SUS is about 900° C., the wax mold 57 is heated at about 700° C. to 900° C., accordingly. In the above, it is possible to perform the casting with high precision by molding the molten metal in a state in which a temperature of the cavity is maintained at the temperature close to the solidifying point of the molten metal, and therefore, it is preferable to heat the wax mold 57 at a temperature close to the maximum temperature.

As described above, the molten metal is poured in a state in which the wax mold 57 is heated and the temperature of the cavity is maintained. In a case in which the ferritic stainless steel is used as the casting material, a temperature of the molten metal is set within a range from 1400° C. to 1700° C. In the above, a temperature of the molten metal is set at a temperature equal to or higher than the melting point of the material forming the sheet metal. It is noted that, the melting point of the coating layer 81 forming the cavity is higher than the temperature of the molten metal.

In the casting step, it is possible to perform the casting with a high precision by pouring the molten metal in a state in which the temperature of the cavity is maintained at a temperature close to the solidifying point of the molten metal. However, if the temperature of the cavity reaches the temperature at which the abnormal oxidation of the material forming the sheet metal (the sheet-metal-made divided body) is caused, the formation of the oxide film is caused on the surface of the sheet metal, resulting in inhibition of the melting by the oxide film, which then causes incomplete melting of the sheet metal in the cavity. Thus, in order to suppress the formation of the oxide film on the surface of the sheet metal, it is possible to cause the material forming the sheet metal to melt at the end portion of the sheet metal by controlling the temperature in the cavity.

The bent portion 22b is formed at the portion to be inserted into the wax 56 in advance in the press step of the sheet-metal-made second inner-pipe divided body 22, the wax mold 57 is formed by inserting the bent portion 22b of the sheet-metal-made second inner-pipe divided body 22 into the wax 56 in a molding step of the wax mold 57, and the ceramic coating is formed on the surface of the wax mold 57. By doing so, it is possible to prevent the sheet-metal-made second inner-pipe divided body 22 from being pulled out from the wax 56 in the step of molding the wax mold 57 by spraying ceramic that is a mold material onto the surface of the wax mold 57 thus formed.

In addition, the surface 22d, which is to be smoothly connected to the cast-metal-made third inner-pipe divided body 23 without forming a step, is formed on the passage inner surface side of the second inner-pipe divided body 22 in advance in the press step of the sheet-metal-made second inner-pipe divided body 22, and the wax mold 57 is insert molded in the molding step of the wax mold 57 such that the wax mold 57 is connected to the passage inner surface side of the sheet-metal-made second inner-pipe divided body 22 without forming a step. By doing so, it is possible to mold a joint portion between the sheet metal portion 58A and the cast portion 58B such that a flow of the exhaust air is not disturbed. In other words, it is possible to achieve formation of a flush surface for reducing turbulence in the inner pipe 20.

As described above, by forming the inner pipe 20 of the turbine housing 10 by integrally casting the one end of the sheet-metal-made divided body into the cast portion of the cast-metal-made divided body in the casting step for manufacturing the cast-metal-made divided body that is made of the cast metal, each of a welding step, a cutting machining processing, and a washing step, which has conventionally been performed after the assembly, is not required or can be simplified (for example, reduction in processing amount), and so, it is possible to manufacture the turbine housing 10 having high precision at low cost.

In addition, as shown in FIG. 10, it is possible to improve a strength of a bonded portion between the sheet metal portion 58A and the cast portion 58B in the molded part 58. Furthermore, a space for handling a welding torch is not required for the casting, and correspondingly, it is possible to reduce the size of the turbine housing 10.

In addition, the center flange 11 and the sheet-metal-made first inner-pipe divided body 21 can also be formed by integrally casting the sheet-metal-made first inner-pipe divided body 21 into the center flange 11 by using the casting mold 50.

In the above, according to the above-described embodiments, although a detailed description has been given for a case in which the sheet-metal-made first and second inner-pipe divided bodies and the exhaust tube forming the inner pipe are cast into the precision-cast-metal-made third inner-pipe divided body and the cast-metal-made flange, the sheet-metal-made first and second outer-pipe divided bodies forming the outer pipe may also be cast into the exhaust-air-inlet side cast-metal-made flange, etc.

As described above, although a detailed description of the present invention has been given in accordance with the embodiments, the present invention is not limited to the above description. For example, the sheet metal material is not limited to the ferritic stainless steel, and austenitic stainless steel may be used, and accordingly, the austenitic stainless steel may also be used as the casting material. In addition, various modifications and improvements can be made within the scope obvious to one with an ordinary skill in the art, and it should not be construed that the description and the drawings constituting a part of this disclosure limit the scope of the present invention. From the disclosure, various alternative embodiments, examples, and operating techniques will be apparent to one with an ordinary skill in the art.

The present invention includes, of course, various embodiments, etc. that are not described in this description. Therefore, the technical scope of the present invention is only defined by the matters specifying the claimed inventions that are appropriate in accordance with the above-described description.

According to the present invention, in a case in which the sheet-metal-made member and the member formed of the casting material are joined integrally, it is possible to ensure sufficient joint strength and to reduce the possibility of occurrence of the fatigue failure due to the vibration and/or thermal stress in the usage environment of the turbine housing.

REFERENCE SIGNS LIST

10: turbine housing
12: exhaust-air-inlet-side flange
12a: opening portion (exhaust gas inlet)
13: exhaust-air-outlet-side flange
13a: opening portion (exhaust gas outlet)
14: turbine wheel
20: inner pipe
21: sheet-metal-made first inner-pipe divided body (sheet-metal-made divided body)
22: sheet-metal-made second inner-pipe divided body (sheet-metal-made divided body)
22b: bent portion
22d: surface smoothly connected without forming step
23: cast-metal-made third inner-pipe divided body (cast-metal-made divided body formed of casting material having higher heat resistance than material made of sheet metal)
50: casting mold
56: wax
57: wax mold (wax pattern)
81: coating layer
B: exhaust gas
K: spiral exhaust gas flow path
O: spiral center portion (center portion)

The invention claimed is:

1. A manufacturing method of a turbine housing having an exhaust gas flow path, the exhaust gas flow path in the turbine housing being formed of a sheet-metal-made divided body and a cast-metal-made divided body, the method comprising:
a step of forming the sheet-metal-made divided body by press molding a sheet metal material; and
a casting step of molding the cast-metal-made divided body, wherein
in the casting step, one end of the sheet-metal-made divided body is cast into the cast-metal-made divided body by melting the one end such that an original shape of the one end is disappeared.

2. The manufacturing method of the turbine housing according to claim 1, wherein the casting step includes:
a wax molding step of molding a wax pattern into a shape of the cast-metal-made divided body into which the one end of the sheet-metal-made divided body is inserted;

a coating step of forming a coating layer on a surface of the wax pattern;

a cavity forming step of forming the cavity by allowing the wax pattern to be disappeared; and a molten metal step of molding the cast-metal-made divided body by pouring the molten metal into an interior of the cavity in a state in which the cavity is heated to a predetermined temperature, and the predetermined temperature is equal to or high than a temperature at which the wax pattern melts and is a temperature at which a high-temperature oxidation resistance of the sheet metal material is maintained.

3. The manufacturing method of the turbine housing according to claim 2, wherein in the cavity forming step, the wax pattern is heated at a temperature equal to or higher than a melting point of the wax pattern and at a temperature at which the high-temperature oxidation resistance of the sheet metal material is maintained.

4. The manufacturing method of the turbine housing according to claim 3, wherein in the step of forming the sheet-metal-made divided body, a bent portion is formed in the one end of the sheet-metal-made divided body, and in the wax molding step, the bent portion is insert molded into the wax pattern, and the sheet-metal-made divided body is fixed to the wax pattern.

5. The manufacturing method of the turbine housing according to claim 3, wherein the wax pattern is molded such that an inner surface of the exhaust gas flow path in the sheet-metal-made divided body is connected to an inner surface of the cast-metal-made divided body smoothly.

6. The manufacturing method of the turbine housing according to claim 1, wherein in the casting step, an end portion of an exhaust tube is cast into the cast-metal-made divided body by melting the end portion.

7. The manufacturing method of the turbine housing according to claim 6, wherein other end portion of the exhaust tube is fixed to an exhaust-air-outlet-side flange by being welded.

* * * * *